United States Patent
Xalter et al.

(10) Patent No.: US 12,312,467 B2
(45) Date of Patent: May 27, 2025

(54) POLYAMIDE MOLDING COMPOSITION FOR HIGH-GLOSS APPLICATIONS

(71) Applicant: BASF SE, Ludwigshafen am Rhein (DE)

(72) Inventors: Rainer Xalter, Ludwigshafen (DE); Torsten Erdmann, Rudolstadt (DE); Xaver Hopfenspirger, Ludwigshafen (DE); Stefan Milimonka, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 641 days.

(21) Appl. No.: 17/435,071

(22) PCT Filed: Mar. 4, 2020

(86) PCT No.: PCT/EP2020/055702
§ 371 (c)(1),
(2) Date: Aug. 31, 2021

(87) PCT Pub. No.: WO2020/178342
PCT Pub. Date: Sep. 10, 2020

(65) Prior Publication Data
US 2022/0135796 A1  May 5, 2022

(30) Foreign Application Priority Data

Mar. 6, 2019 (EP) .................................... 19161124

(51) Int. Cl.
*C08L 77/06* (2006.01)
*C08J 5/18* (2006.01)

(52) U.S. Cl.
CPC ................ *C08L 77/06* (2013.01); *C08J 5/18* (2013.01); *C08J 2377/06* (2013.01); *C08J 2477/06* (2013.01); *C08L 2205/02* (2013.01)

(58) Field of Classification Search
CPC .......... C08K 3/013; C08K 5/005; C08K 7/14; C08L 77/02–06; C08L 2205/02–025; C08L 77/00–06; C08L 2666/54; C08L 2666/72; C08J 2377/06; C08J 2477/06
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,393,210 A | 7/1968 | Speck |
| 10,669,394 B2 | 6/2020 | Xue et al. |
| 2004/0102559 A1 | 5/2004 | Oyamada et al. |
| 2006/0014035 A1 | 1/2006 | Montanari et al. |
| 2008/0262133 A1 | 10/2008 | Eibeck et al. |
| 2015/0065641 A1 | 3/2015 | Deyrail et al. |
| 2015/0218374 A1 | 8/2015 | Thomas et al. |

FOREIGN PATENT DOCUMENTS

| | | |
|---|---|---|
| CA | 2256100 A1 | 7/1999 |
| CN | 101115786 A | 1/2008 |
| CN | 102732000 A | 10/2012 |
| CN | 102732001 A | 10/2012 |
| CN | 105017766 A | 11/2015 |
| CN | 107057337 A | 8/2017 |
| CN | 107810239 A | 3/2018 |
| EP | 0038094 A2 | 10/1981 |
| EP | 0038582 A2 | 10/1981 |
| EP | 0039524 A1 | 11/1981 |
| EP | 1803786 A1 | 7/2007 |
| EP | 2553021 A1 | 2/2013 |
| EP | 3069871 A1 | 9/2016 |
| JP | S57212252 A | 12/1982 |
| JP | H1029221 A | 2/1998 |
| JP | H11140308 A | 5/1999 |
| JP | 2016124992 A | 1/2015 |
| WO | 2012070598 A1 | 5/2012 |

OTHER PUBLICATIONS

International Search Report for corresponding PCT/EP2020/055702 mailed May 29, 2020, 3 Pages.

*Primary Examiner* — Ana L. Woodward
(74) *Attorney, Agent, or Firm* — Armstrong Teasdale LLP

(57) ABSTRACT

Described herein is a thermoplastic molding material including
a) a mixture of 100 parts by weight of polyamide including aliphatic unbranched $C_{10-12}$-foundational units and 5 to 100 parts by weight of polyamide 6 and/or polyamide 6/6,6 as component A), and
b) 0% to 30% by weight, based on component A), of further additives as component B), including 0% to 20% by weight, based on component A), of inorganic fillers and reinforcing materials.

7 Claims, No Drawings

POLYAMIDE MOLDING COMPOSITION FOR HIGH-GLOSS APPLICATIONS

CROSS-REFERENCE TO RELATED APPLICATIONS

This application is a U.S. National Phase Application of International Patent Application No. PCT/EP2020/055702, filed Mar. 4, 2020, which claims priority to European Patent application Ser. No. 19/161,124.3, filed Mar. 6, 2019, the entire contents of which are hereby incorporated by reference herein.

The invention relates to polyamide molding materials for high-gloss applications, in particular in the automotive exterior sector. The molding materials shall be suitable for producing unpainted high-gloss components having in particular good gloss properties, good toughness and high resistance to road salt and automatic carwashes.

Polyamides are among the polymers produced on a large scale globally and, in addition to their main fields of use in films, fibers and shaped articles (materials), serve a multitude of other end uses. Among the polyamides, polyamide 6 (polycaprolactam) and polyamide 66 (nylon, polyhexamethyleneadipamide) are the polymers produced in the largest volumes. Most polyamides of industrial significance are semicrystalline or amorphous thermoplastic polymers featuring a high thermal stability. Surface properties and intrinsic road salt resistance can be improved through blends with long-chain polyamides.

JPS57212252 relates to mixtures of polyamide 6 with 5% to 35% by weight of polyamide 6,10 which are said to exhibit improved resistance to calcium chloride.

CA 2 256 100 A1 relates to polyamide compositions having improved surface properties and weathering resistance. The employed polyamides have a low extract proportion and are combined with a special carbon black pigment and an inorganic stabilizer as well as a reinforcer.

JP2016124992 relates to polyamide resin compositions which are said to provide good mechanical properties and a good appearance of shaped articles. The polyamide resins comprise 30% to 70% by weight of glass fibers. The extrapolated crystallization starting point for the molding compound is 175° C. to 200° C.

JPH1029221 relates to a process for injection molding an automotive door handle having good surface properties. Injection molding is effected in a thermally insulated mold. Input materials include inter alia nylon.

US 2004/0102559 A1 relates to polyamide resin compositions which contain 30 to 70 parts by weight of an inorganic filler and also carbon black. The inorganic filler comprises glass fibers and at least one species selected from wollastonite, talc, kaolin and mica.

It is an object of the present invention to provide thermoplastic molding materials which are particularly suitable for producing unpainted high-gloss components in the automotive exterior sector having good gloss properties, good toughness and high resistance to road salt and automatic carwashes. The gloss properties should be retained very largely unchanged upon exposure to road salt or automatic carwashes.

The object is achieved in accordance with the invention by a thermoplastic molding material comprising
a) a mixture of 100 parts by weight of polyamide comprising aliphatic unbranched $C_{10-12}$-foundational units and 5 to 100 parts by weight of polyamide 6 and/or polyamide 6/6,6 as component A),
b) 0% to 30% by weight, based on component A), of further additives as component B), including 0% to 20% by weight, based on component A), of inorganic fillers and reinforcing materials.

The object is further achieved by a process for producing such molding materials wherein the components A) and B) and optionally further ingredients are mixed with one another.

The object is further achieved by the use of the molding materials for producing films or shaped articles and by corresponding films or shaped articles.

The object is further achieved by the use of mixtures of 100 parts by weight of polyamide comprising aliphatic unbranched $C_{10-12}$-foundational units and 5 to 100 parts by weight of polyamide 6 and/or polyamide 6/6,6 in molding materials for producing, especially high-gloss, shaped articles having improved gloss properties after exposure of the shaped articles to road salt and/or automatic carwashes.

The object is further achieved by the use of mixtures of 100 parts by weight of polyamide comprising aliphatic unbranched $C_{10-12}$-foundational units and 5 to 100 parts by weight of polyamide 6 and/or polyamide 6/6,6 in shaped articles for improving gloss properties upon exposure of the shaped articles to road salt and/or automatic carwashes.

The films or shaped articles preferably have a gray scale in the gray scale assessment according to ISO 105 A02 after testing according to DBL 5416, 7.3, of at least 4, preferably 4, 4 to 5 or 5, after the test.

The thermoplastic molding materials contain as component A) a mixture of 100 parts by weight of polyamide comprising aliphatic unbranched $C_{10-12}$-foundational units and 5 to 100 parts by weight of polyamide 6 and/or polyamide 6/6,6.

Polyamide 6/6,6 is a copolyamide comprising any desired proportions of monomers of polyamide 6 and polyamide 6,6 or a mixture of both polyamides. Both components may be employed in identical mole fractions, in excess or deficiency. Mixtures of polyamide 6 and polyamide 6,6 may also be employed. However, it is particularly preferable to employ a copolyamide 6/6,6 in addition to polyamide 6.

In addition to polyamide 6 and/or polyamide 6/6,6 component A) comprises at least one polyamide comprising aliphatic unbranched $C_{10-12}$-foundational units. This may be a homopolyamide or copolyamide. For example a portion or the entirety of the dicarboxylic acid and/or diamine may be aliphatic unbranched $C_{10-12}$-dicarboxylic acid or aliphatic unbranched $C_{10-12}$-diamines. These are especially aliphatic unbranched terminal $C_{10-12}$-dicarboxylic acids or -diamines. They may also be corresponding $C_{10-12}$-lactams or aminonitriles which result in corresponding foundational units in the polyamide. It is preferable when the total amount of diamine or dicarboxylic acid is aliphatic unbranched terminal $C_{10-12}$-diamine or -dicarboxylic acid. The polyamide is preferably selected from polyamide 6,10, polyamide 6,12, polyamide 12,12, polyamide 11, polyamide 12 and mixtures thereof. Polyamide 6,10 is particularly preferred.

If the polyamide comprises not only unbranched $C_{10-12}$-foundational units the other foundational units are preferably $C_{4-12}$-foundational units, especially $C_{6-12}$-foundational units, which are preferably likewise aliphatic and unbranched, and in particular terminal.

The polyamide 6,10 preferably has the following properties:
VN=120 to 250 mL/g, determined according to DIN ISO 307 (2007/2008).

Employed according to the invention in particular are polyamide 6 or copolymers or mixtures thereof with polyamide 66. The polyamide 6 or polyamide 66 preferably has a viscosity number of in the range from 80 to 200 ml/g, in particular 100 to 180 ml/g, in particular 120 to 170 ml/g, determined in a 0.5% by weight solution in 96% by weight sulfuric acid at 25° C. according to ISO 307.

In component A) the proportion of polyamide 6 and/or polyamide 6/6,6 is preferably 10 to 80 parts by weight, particularly preferably 10 to 70 parts by weight. The amounts relate to the sum of polyamide 6 and polyamide 6/6,6 or to the individual substances when using individual substances.

As component B) or a portion thereof the compositions according to the invention may comprise 0% to 30% by weight, preferably 0% to 20% by weight and in particular 0% to 10% by weight of further additives. In the event of co-use of such additives the minimum amount is 0.1% by weight, preferably 0.2% by weight, in particular 0.5% by weight, based on the thermoplastic molding material.

Contemplated further additives include thermoplastic polymers distinct from component A), glass fibers, fillers and reinforcers distinct from glass fibers or further additives.

In the below-mentioned additives suitable as component B) the respective percentages by weight are based on component A). If a plurality of additives are present the upper limit recited hereinabove applies to the sum of the amounts of all additives.

As component B) or a portion thereof the thermoplastic molding materials may comprise 0% to 30% by weight, by preference 0% to 25% by weight, preferably 0% to 20% by weight, of at least one thermoplastic polyamide distinct from polyamides of the component A). However, it is preferable when no further polyamides are present.

These polyamides generally have a viscosity number of 80 to 100 ml/g, preferably 100 to 160 ml/g, determined in a 0.5% by weight solution in 96.0% by weight sulfuric acid at 25° C. according to ISO 307.

Semicrystalline or amorphous resins having a molecular weight (weight average) of at least 5000, such as are described for example in U.S. Pat. Nos. 2,071,250, 2,071,251, 2,130,523, 2,130,948, 2,241,322, 2,312,966, 2,512,606 and 3,393,210, are preferred.

Examples thereof are polyamides which derive from lactams having 8 to 13 ring members, such as polycaprylolactam and polylaurolactam, and also polyamides obtained by reaction of dicarboxylic acids with diamines.

Employable dicarboxylic acids include alkanedicarboxylic acids having 6 to 12 carbon atoms, in particular 6 to 10 carbon atoms, and aromatic dicarboxylic acids. These include only the acids adipic acid, azelaic acid, sebacic acid, dodecanedioic acid, cyclohexanedicarboxylic acid and terephthalic and/or isophthalic acid.

Particularly suitable diamines include alkanediamines having 6 to 12, in particular 6 to 9, carbon atoms and m-xylylenediamine, di(4-aminophenyl)methane, di(4-aminocyclo-hexyl)methane, 2,2-di(4-aminophenyl)propane, 2,2-di(4-aminocyclohexyl)propane or 1,5-diamino-2-methylpentane.

Also suitable are polyamides obtainable for example by condensation of 1,4-diaminobutane with adipic acid at elevated temperature (polyamide 4,6) or polyamide 4T. Production processes for polyamides having this structure are described for example in EP-A-38 094, EP-A-38 582 and EP-A-039 524.

Also suitable are polyamides obtainable by copolymerization of two or more of the above-mentioned monomers or mixtures of a plurality of polyamides in any desired mixing ratio.

Suitable polyamides preferably have a melting point of less than 265° C. or have an amorphous character.

The following nonexhaustive list includes the recited polyamides and also further polyamides within the meaning of the invention (including component A)) as well as the monomers present.

AB polymers:

| PA 4 | pyrrolidone |
|---|---|
| PA 6 | ε-caprolactam |
| PA 7 | ethanolactam |
| PA 8 | caprylolactam |
| PA 9 | 9-aminopelargonic acid |
| PA 11 | 11-aminoundecanoic acid |
| PA 12 | laurolactam |

AA/BB polymers:

| PA 46 | tetramethylenediamine, adipic acid |
|---|---|
| PA 66 | hexamethylenediamine, adipic acid |
| PA 69 | hexamethylenediamine, azelaic acid |
| PA 610 | hexamethylenediamine, sebacic acid |
| PA 612 | hexamethylenediamine, decanedicarboxylic acid |
| PA 613 | hexamethylenediamine, undecanedicarboxylic acid |
| PA 1212 | 1,12-dodecanediamine, decanedicarboxylic acid |
| PA 1313 | 1,13-diaminotridecane, undecanedicarboxylic acid |
| PA 6T | hexamethylenediamine, terephthalic acid |
| PA MXD6 | m-xylylenediamine, adipic acid |
| PA 9T | nonamethylenediamine, terephthalic acid |

AA/BB polymers:

| PA6I | hexamethylenediamine, isophthalic acid |
|---|---|
| PA 6-3-T | trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PAPACM 12 | diaminodicyclohexylmethane, laurolactam |
| PA 6I/6T/PACMT | as per PA 6I/6T + diaminodicyclohexylmethane, terephthalic acid |
| PA 6T/6I/MACMT | as per PA 6I/6T + dimethyldiaminocyclohexylmethane, terephthalic acid |
| PA 6T/6I/MXDT | as per PA 6I/6T + m-xylylenediamine, terephthalic acid |
| PA 12/MACMI | laurolactam, dimethyldiaminodicyclohexylmethane, isophthalic acid |
| PA 12/MACMT | laurolactam, dimethyldiaminodicyclohexylmethane, terephthalic acid |
| PA PDA-T | phenylenediamine, terephthalic acid |
| PA 6T/6I | (see PA 6T and PA 6I) |
| PA 6T/66 | (see PA 6T and PA 66) |

Component B) may be a blend of at least one aliphatic polyamide and at least one semiaromatic or aromatic polyamide.

Also employable in place of or in addition to polyamide 6I/6T are polyamide 6I or polyamide 1.5I/1.5T based on methylpentamethylenediamine and isophthalic acid/terephthalic acid or mixtures thereof and also polyamide-based thermoplastic elastomers.

Also possible for example is co-use of a copolyamide produced by polymerization of the components A') 15% to 84% by weight of at least one lactam B') 16% to 85% by weight of a monomer mixture (M) comprising the components B1') at least one $C_{32}$-$C_{40}$-dimer acid and B2') at least one $C_4$-$C_{12}$-diamine, wherein the percentages by weight of the components A') and B') are in each case based on the sum of the percentages by weight of the components A') and B'). Particularly preferred as such a component is PA6/6,36.

Co-use of further polymers in addition to the abovementioned polyamide/component A) is also possible.

The thermoplastic polymers distinct from component A) are preferably selected from homo- or copolymers which comprise in copolymerized form at least one monomer selected from $C_2$-$C_{10}$-monoolefins, for example ethylene or propylene, 1,3-butadiene, 2-chloro-1,3-butadiene, vinyl alcohol and the $C_2$-$C_{10}$-alkyl esters thereof, vinyl chloride, vinylidene chloride, vinylidene fluoride, tetrafluoroethylene, glycidyl acrylate, glycidyl methacrylate, acrylates and methacrylates having alcohol components of branched and unbranched $C_1$-$C_{10}$-alcohols, vinylaromatics, for example styrene, acrylonitrile, methacrylonitrile, α, β-ethylenically unsaturated mono- and dicarboxylic acids, and maleic anhydride, homo- and copolymers of vinyl acetals,
polyvinyl esters,
polyesters, such as polyalkylene terephthalates, polyhydroxyalkanoates (PHA), polybutylene succinates (PBS), polybutylene succinate adipates (PBSA),
polyethers,
polyether ketones,
polysulfides,
polysulfones,
polyether sulfones,
cellulose alkyl esters
and mixtures thereof.

Examples include polyacrylates having identical or different alcohol radicals from the group of $C_4$-$C_8$ alcohols, particularly of butanol, hexanol, octanol and 2-ethylhexanol, polymethyl-methacrylate (PMMA), methyl methacrylate-butyl acrylate copolymers, acrylonitrile-butadiene-styrene copolymers (ABS), ethylene-propylene copolymers, ethylene-propylene-diene copolymers (EPDM), polystyrene (PS), styrene-acrylonitrile copolymers (SAN), acrylonitrile-styrene-acrylate (ASA), styrene-butadiene-methyl methacrylate copolymers (SBMMA), styrene-maleic anhydride copolymers, styrene-methacrylic acid copolymers (SMA), polyoxymethylene (POM), polyvinyl alcohol (PVAL), polyvinyl acetate (PVA), polyvinyl butyral (PVB), polycaprolactone (PCL), polyhydroxybutyric acid (PHB), polyhydroxyvaleric acid (PHV), polylactic acid (PLA), ethyl cellulose (EC), cellulose acetate (CA), cellulose propionate (CP) or cellulose acetate/butyrate (CAB).

In the context of the invention the term "filler and reinforcer" (=possible component B)) is to be interpreted broadly and comprises particulate fillers, fibrous substances and any intermediate forms. Particulate fillers may have a wide range of particle sizes ranging from particles in the form of dusts to large grains. Contemplated filler materials include organic or inorganic fillers and reinforcers. Employable here are for example inorganic fillers, such as kaolin, chalk, wollastonite, talc, calcium carbonate, silicates, titanium dioxide, zinc oxide, graphite, glass particles, for example glass spheres, nanoscale fillers, such as carbon nano-tubes, nanoscale phyllosilicates, nanoscale aluminum oxide ($Al_2O_3$) or barium sulfate, nanoscale titanium dioxide ($TiO_2$), graphene, permanently magnetic or magnetizable metal compounds and/or alloys, phyllosilicates and nanoscale silicon dioxide ($SiO_2$). The fillers may also have been surface treated.

Examples of phyllosilicates usable in the molding materials according to the invention include kaolins, serpentines, talc, mica, vermiculites, illites, smectites, montmorillonite, hectorite, double hydroxides or mixtures thereof. The phyllosilicates may have been surface treated or may be untreated.

One or more fibrous substances may—less preferably—also be employed. These are preferably selected from known inorganic reinforcing fibers, such as boron fibers, carbon fibers, silica fibers, ceramic fibers and basalt fibers; organic reinforcing fibers, such as aramid fibers, polyester fibers, nylon fibers, polyethylene fibers and natural fibers, such as wood fibers, flax fibers, hemp fibers and sisal fibers.

As component B) or a portion thereof the thermoplastic molding materials may comprise 0% to 20% by weight, preferably 0 to 10% by weight, of glass fibers.

As component B) or part thereof, the molding compositions according to the invention comprise for example 1% to 10% by weight or 1% to 5% by weight of glass fibers. However, it is preferable when no glass fibers are present.

Especially chopped glass fibers may be employed. The component B) especially comprises glass fibers, it being preferable to employ short fibers. These preferably have a length in the range from 2 to 50 mm and a diameter of 5 to 40 μm. It is alternatively possible to use continuous fibers (rovings). Suitable fibers include those having a circular and/or noncircular cross-sectional area, wherein in the latter case the dimensional ratio of the main cross-sectional axis to the secondary cross-sectional axis is especially >2, preferably in the range from 2 to 8 and particularly preferably in the range from 3 to 5.

In a specific embodiment component B) comprises so-called "flat glass fibers". These specifically have an oval or elliptical cross-sectional area or a necked elliptical (so-called "cocoon" fibers) or rectangular or virtually rectangular cross-sectional area. Preference is given here to using glass fibers with a noncircular cross-sectional area and a dimensional ratio of the main cross-sectional axis to the secondary cross-sectional axis of more than 2, preferably of 2 to 8, in particular of 3 to 5.

Reinforcement of the molding materials according to the invention may also be effected using mixtures of glass fibers having circular and noncircular cross sections. In a specific embodiment the proportion of flat glass fibers, as defined above, predominates, i.e. they account for more than 50% by weight of the total mass of the fibers.

When rovings of glass fibers are used as component B) said fibers preferably have a diameter of 10 to 20 μm, preferably of 12 to 18 μm. The cross section of these glass fibers may be round, oval, elliptical, virtually rectangular or rectangular. So-called flat glass fibers having a ratio of the cross-sectional axes of 2 to 5 are particularly preferred. E glass fibers are used in particular. However, it is also possible to use any other glass fiber types, for example A, C, D, M, S or R glass fibers, or any desired mixtures thereof or mixtures with E glass fibers.

Suitable preferred additives B) are demolding assistants and heat stabilizers but also flame retardants, light stabilizers (UV stabilizers, UV absorbers or UV blockers), dyes, carbon black, nucleating agents, organic or inorganic pigments or metallic pigments, metal flakes, metal-coated particles, antistats, conductivity additives, demolding agents, optical brighteners, defoamers etc. According to the invention the colorant is employed in an amount of 0.05% to 10% by weight, preferably 0.1% to 5% by weight, based on the total molding material.

Co-use of carbon black as component B) is also possible. The compositions according to the invention comprise for example 0.01% to 5% by weight, by preference 0.05% to 3% by weight, preferably 0.01% to 2.5% by weight, of carbon black Carbon black, also known as industrial carbon black, is a modification of carbon with a high surface-to-volume ratio and consists of 80% to 99.5% by weight of carbon. The specific surface area of industrial carbon black is about 10 to 1500 m$^2$/g (BET). The carbon black may have been produced in the form of channel black, furnace black, flame black, cracking black or acetylene black. The particle diameter is in the range from 8 to 500 nm, typically 8 to 110 nm. Carbon black is also referred to as pigment black 7 or lamp black 6. Color blacks are nanoparticulate carbon blacks that, due to their fineness, increasingly lose the brown base hue of conventional carbon blacks.

As component B) it is preferable to employ pigments including effect pigments, such as metallic pigments, pearlescent pigments, carbon black, dyes, lubricants and optionally heat and UV stabilizers. Flame retardant additives are preferably not employed. The co-use of mineral fillers is possible. The use of glass fibers is less preferred since they can impair the surface gloss of the components.

Component B) may comprise 0.1% to 2% by weight, preferably 0.1% to 1% by weight, of demolding agents.

As component B) the molding materials according to the invention may comprise preferably 0.01% to 3% by weight, particularly preferably 0.02% to 2% by weight, in particular 0.05% to 1.0% by weight, of at least one heat stabilizer based on the total weight of the composition.

The heat stabilizers are preferably selected from copper compounds, secondary aromatic amines, sterically hindered phenols, phosphites, phosphonites and mixtures thereof.

If a copper compound is used the amount of copper is preferably 0.003% to 0.5% by weight, in particular 0.005% to 0.3% by weight and particularly preferably 0.01% to 0.2% by weight based on the total weight of the composition.

If stabilizers based on secondary aromatic amines are used the amount of these stabilizers is preferably 0.2% to 2% by weight, particularly preferably 0.2% to 1.5% by weight, based on the total weight of the composition.

If stabilizers based on sterically hindered phenols are used the amount of these stabilizers is preferably 0.1% to 1.5% by weight, particularly preferably 0.2% to 1% by weight, based on the total weight of the composition.

If stabilizers based on phosphites and/or phosphonites are used the amount of these stabilizers is preferably 0.1% to 1.5% by weight, particularly preferably from 0.1% to 1% by weight, based on the total weight of the composition.

Suitable compounds B) of mono- or divalent copper are, for example, salts of mono- or di valent copper with inorganic or organic acids or mono- or dihydric phenols, the oxides of mono- or divalent copper or the complexes of copper salts with ammonia, amines, amides, lactams, cyanides or phosphines, preferably Cu(I) or Cu(II) salts of hydrohalic acids or of hydrocyanic acids or the copper salts of aliphatic carboxylic acids. Particular preference is given to the monovalent copper compounds CuCl, CuBr, CuI, CuCN and $Cu_2O$ and to the divalent copper compounds $CuCl_2$, $CuSO_4$, CuO, copper(II) acetate or copper(II) stearate or copper(II) pyrophosphate.

The copper compounds are commercially available and/or the production thereof is known to those skilled in the art. The copper compound may be used as such or in the form of concentrates. A concentrate is to be understood as meaning a polymer, preferably of the same chemical nature as component B), comprising the copper salt in a high concentration. The use of concentrates is a customary process and is particularly often employed when very small amounts of an input material are to be added. It is advantageous to employ the copper compounds in combination with further metal halides, in particular alkali metal halides, such as NaI, KI, NaBr or KBr, wherein the molar ratio of metal halide to copper halide is 0.5 to 20, preferably 1 to 10 and particularly preferably 3 to 7.

Particularly preferred examples of stabilizers which are based on secondary aromatic amines and are usable in accordance with the invention include adducts of phenylenediamine with acetone (Naugard® A), adducts of phenylenediamine with linolenic acid, 4,4'-bis(α, α-dimethylbenzyl) diphenylamine (Naugard® 445), N,N'-dinaphthyl-p-phenylenediamine, N-phenyl-N'-cyclohexyl-p-phenylenediamine or mixtures of two or more thereof.

Preferred examples of stabilizers employable according to the invention and based on sterically hindered phenols include N,N'-hexamethylenebis-3-(3,5-di-tert-butyl-4-hydroxyphenyl)propionamide, bis(3,3-bis(4'-hydroxy-3'-tert-butylphenyl)butanoic acid) glycol ester, 2,1'-thioethyl bis(3-(3,5-di-tert-butyl-4-hydroxyphenyl))propionate, 4,4'-butylidenebis(3-methyl-6-tert-butylphenol), triethylene glycol 3-(3-tert-butyl-4-hydroxy-5-methylphenyl)propionate or mixtures of two or more of these stabilizers.

Preferred phosphites and phosphonites are triphenyl phosphite, diphenyl alkyl phosphite, phenyl dialkyl phosphite, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythrityl diphosphite, bis(2,4-di-tert-butylphenyl) pentaerythrityl diphosphite, bis(2,6-di-tert-butyl-4-methylphenyl) pentaerythrityl diphosphite, diisodecyloxy pentaerythrityl diphosphite, bis(2,4-di-tert-butyl-6-methylphenyl) pentaerythrityl diphosphite, bis(2,4,6-tris(tert-butylphenyl)) pentaerythrityl diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenzo-[d,g]-1,3,2-dioxaphosphocin, 6-fluoro-2,4,8,10-tetra-tert-butyl-12-methyldibenzo-[d,g]-1,3,2-dioxaphosphocin, bis(2,4-di-tert-butyl-6-methylphenyl) methyl phosphite and bis(2,4-di-tert-butyl-6-methylphenyl) ethyl phosphite. Preference is given in particular to tris[2-tert-butyl-4-thio(2'-methyl-4'-hydroxy-5'-tert-butyl)phenyl-5-methyl]phenyl phosphite and tris(2,4-di-tert-butylphenyl) phosphite (Irganox® 168: commercially available from BASF SE).

It is especially preferable to eschew the use of glass fibers, fillers and reinforcers, since they can impair the optical properties of the molding materials.

The polyamide molding materials are produced by processes known per se. These include the mixing of the components in the appropriate proportions by weight.

It is also possible to employ recyclates of the individual components or else of mixtures.

The mixing of the components is preferably accomplished at elevated temperatures by commixing, blending, kneading, extruding or rolling. The temperature during mixing is preferably in a range from 220° C. to 360° C., particularly preferably from 240° C. to 350° C. and especially from 250° C. to 340° C. Suitable methods are known to those skilled in the art.

Shaped Articles

The present invention further relates to shaped articles produced using the polyamide molding materials according to the invention.

The polyamide molding materials may be used for producing moldings by any desired suitable processing techniques. Suitable processing techniques are especially injection molding, extrusion, coextrusion, thermoforming or any other known polymer shaping method.

Preferred thermoplastic molding materials and films or shaped articles produced therefrom have a gray scale in the gray scale assessment according to ISO 105 A02 after testing according to DBL 5416, 7.3, of at least 4, preferably of 4, 4 to 5 or 5.

The polyamide molding materials are further advantageously suitable for use for automotive moldings, for producing moldings for electrical and electronic devices and for moldings in the consumer goods sector.

Shaped articles in the form of or as part of a component for the automotive sector are a specific embodiment.

Possible uses in automobile interiors are for dashboards, steering-column switches, seat components, headrests, center consoles, door modules, in automotive exteriors for A, B, C, or D pillar covers, spoilers, door handle covers, exterior mirror components, windshield wiper components, windshield wiper protective housings, decorative grilles, cover strips, roof rails, window frames, sunroof frames, antenna trim covers, front and rear lights, radiator grilles and exterior body parts.

Forming a further specific embodiment are shaped articles as such or as part of an electrical or electronic passive or active component, a housing constituent, a film, a conduit, in particular in the form of or as part of a switch.

The molding preferably includes functional elements which require mechanical toughness. Examples of such functional elements are film hinges, snap-in hooks and spring tongues.

Possible uses of the polyamides according to the invention for the kitchen and household sector are for producing door handles or components for kitchen machines, for example of fryers, clothes irons, and also applications in the garden sector, for example components for irrigation systems or garden equipment.

The polyamide molding material for producing moldings is produced by methods known per se. Reference is made here to the abovementioned processes for producing the polyamide composition. These include the mixing of the components in the appropriate proportions by weight. The mixing of the components is preferably accomplished at elevated temperatures by commixing, blending, kneading, extruding or rolling. The temperature during mixing is preferably in a range from 220° C. to 360° C., particularly preferably from 240° C. to 350° C. and especially from 250° C. to 340° C. Premixing of individual components may be advantageous. It is further also possible to produce the moldings directly from a physical mixture (dryblend) of premixed components and/or individual components which has been produced well below the melting point of the polyamide. In that case the temperature during the mixing is preferably 0° C. to 100° C., particularly preferably 10° C. to 50° C., in particular ambient temperature (25° C.). The molding materials may be processed into moldings by customary processes, for example by injection molding or extrusion.

The invention is more particularly elucidated hereinbelow by the following examples. All examples relate to black-colored compounds, which are exemplary for all further possible colors. Black is the most critical shade, especially in terms of resistance to road salt and automatic carwashes, since surface changes are most clearly recognizable in black shaped articles.

EXAMPLES

Materials:

| | |
|---|---|
| PA 6,10: | Zytel ® RS LC3060 NC010 from DuPont |
| PA 6: | Ultramid ® B27 from BASF, VN = 150 mL/g |
| PA 66/6: | copolymer comprising 85% by weight of PA66, 15% by weight of PA6, VN = 145 mL/g, |
| PA 66: | Ultramid ® A27 from BASF, VN = 150 mL/g |
| SAN: | Luran ® HH 120 SPF50 from Styrolution |
| Carbon black: | Black Pearls ® 880 from Cabot |
| Calcium stearate: | Ceasit ® from Baerlocher |

Characterization Methods:
Notched impact strength according to ISO 179/1eU (2018 version);
Gloss determination according to DIN EN ISO 2813 (2015);
Road salt resistance according to Daimler standard DBL 5416, 7.3 (2011-02);
Automatic carwash resistance according to DIN EN ISO 20566 (2013-06):
Washing brush: diameter 1000 mm, width 400 mm, material polyethylene, x-shaped and spliced, bristle thickness 0.8 mm, bristle length 440 mm, immersion depth 100 mm, brush speed 120 rpm
Spray nozzles: made of stainless steel, opening angle 60°, water flow rate 2.2 L/min at 300 kPas
Advancement rate of sample table: (5±0.2) m/min
Washing solution: suspension of 1.5 g quartz flour (average particle size 24 μm) per liter of drinking water
Room climate: air-conditioned room at (23±2)° C. and atmospheric humidity (50±5)%
Performing the test: The samples were conditioned for 16 hours under standard conditions of temperature and humidity. The zero values for gloss were then determined. The sample plates were then placed on the sample table and subjected to ten double strokes. The sample plates were subsequently cleaned with cold water, then cleaned with a suitable solvent (for example ethanol) and a cloth and flashed off for 10 minutes. The gloss values for the treated samples were then measured
Gray scale determination according to ISO 105 A02 (1993-09).

Production of the Compounds:
Ref. 2 to 8, Examples 1 to 6
The plastic molding materials described in the comparative examples and the inventive examples were produced by melt mixing of the individual components in a ZSK 26 MC twin-screw extruder from Coperion at a throughput of 25 kg/h and a housing temperature of 260° C. The melt was discharged as a strand through a 4 mm die, cooled in a water bath until pelletizable and pelletized.

Production of the Test Specimens:
Ref. 1:
Test specimens for testing notched impact strength were produced according to ISO 179-2/1 eA on an Arburg 420C injection molding machine at a melt temperature of about 240° C. and a mold temperature of about 80° C. Plates having dimensions of 60×60×2 mm³ for gloss assessment and for testing resistance to road salt and automatic carwashes were produced on the same injection molding machine at the same temperatures using a highly polished counter plate.

Ref. 2 to 8, Examples 1 to 6:
Test specimens for testing notched impact strength were produced according to ISO 179-2/1 eA on an Arburg 420C injection molding machine at a melt temperature of about 280° C. and a mold temperature of about 100° C. Plates having dimensions of 60×60×2 mm³ for gloss assessment and for testing resistance to road salt and automatic carwashes were produced on the same injection molding machine at a melt temperature of about 270° C. and a mold temperature of about 30° C. using a highly polished counter plate.

The results are shown summarized in table 1.

Evaluation of the Results:

Ref. 1: SAN (Luran® HH 120 SPF50) is a commercially available product for exterior automotive parts having a high gloss appearance with a piano lacquer look. The material has a very high gloss value; however, it is very brittle and therefore not well suited for components with integrated functionality, such as for example snap hooks, or for crash-relevant parts. It also has a very low gloss retention in the carwash test.

Ref. 2 to 4: Standard polyamides such as PA6, PA6,6 and PA6,6/6 have markedly higher toughnesses at acceptable gloss values and also a significantly improved resistance to automatic carwashes but road salt resistance is low for these materials.

Ref. 5: PA6,10 (Zytel® RX LC3060) ensures very good resistance to road salt. However, the use of pure PA6,10 results in lower initial gloss and reduced gloss retention compared to standard polyamides (Ref. 2 to 4).

Ref. 6: A mixture of 100 parts of PA6,10 with 25 parts of PA6,6 is resistant to road salt and has better resistance to automatic carwashes compared to pure PA6,10 but the initial gloss value is further reduced.

Surfaces with at least 88 gloss units according to DIN EN ISO 2813 (2015) are considered high-gloss.

Ref. 7 and 8: Mixtures of 100 parts of PA6,10 with 120 or more parts of PA6 and/or PA6,6/6 show a markedly reduced resistance to road salt.

Examples 1 to 6: Mixtures of 100 parts of PA6,10 with 5 to 90 parts of PA6 and/or PA6,6/6 show improved gloss and gloss retention in the automatic carwash test compared to pure PA6,10 at similar toughness and high road salt resistance (gray scale at least 4 according to test).

TABLE 1

| | Ref. 1 | Ref. 2 | Ref. 3 | Ref. 4 | Ref. 5 | Ref. 6 | Ref. 7 | Ref. 8 | Ex. 1 | Ex. 2 | Ex. 3 | Ex. 4 | Ex. 5 | Ex. 6 |
|---|---|---|---|---|---|---|---|---|---|---|---|---|---|---|
| SAN | 100 | | | | | | | | | | | | | |
| PA 66 | | 99.2 | | | | 25 | | | | | | | | |
| PA 6 | | | 99.2 | | | | | 25 | | | | | | |
| PA 6,6/6 | | | | 99.2 | | | 120 | 160 | | 5 | 10 | 25 | 45 | 90 |
| PA 6,10 | | | | | 99.2 | 100 | 100 | 100 | 100 | 100 | 100 | 100 | 100 | 100 |
| Carbon black | | 0.5 | 0.5 | 0.5 | 0.5 | 0.5 | 0.5 | 0.5 | 0.5 | 0.5 | 0.5 | 0.5 | 0.5 | 0.5 |
| Calcium stearate | | 0.3 | 0.3 | 0.3 | 0.3 | 0.3 | 0.3 | 0.3 | 0.3 | 0.3 | 0.3 | 0.3 | 0.3 | 0.3 |
| Notched impact strength 23° C. (kJ/m²) | 1.3 | 3.1 | 6.0 | 5.2 | 4.7 | 3.6 | 3.5 | 3.9 | 4.7 | 4.7 | 4.6 | 4.0 | 3.7 | 3.8 |
| Road salt resistance test according to DBL 5416, 7.3 | no damage | severe cracking, graying | severe cracking, graying | severe cracking, graying | no damage | no damage | slight graying | marked graying | no damage | no damage | no damage | no damage | no damage | minimal graying |
| gray scale assessment according to ISO 105 A02 after testing according to DBL 5416, 7.3 | 5 | 1 | 1 | 1 | 5 | 5 | 3-4 | 3 | 5 | 5 | 5 | 5 | 4-5 | 4 |
| Gloss (%) at 20° angle | 99.9 | 91.5 | 90.8 | 91.3 | 86.8 | 83.7 | 88.9 | 88.5 | 89.0 | 88.4 | 88.9 | 88.9 | 88.7 | 88.8 |
| Gloss retention (20°) after automatic carwash test (%) | 14 | 37 | 42 | 42 | 25 | 36 | 36 | 38 | 35 | 27 | 32 | 33 | 33 | 34 |

The invention claimed is:

1. A shaped article in the form of or as part of a component for the automotive sector made of a thermoplastic molding material wherein the thermoplastic molding material consists of
   a) a mixture of 100 parts by weight of polyamide 6, 10 and 5 to 100 parts by weight of polyamide 6 and/or polyamide 6/6,6 as component A), and
   b) 0.1% to 10% by weight, based on component A), of further additives as component B), wherein component B) comprises 0.1% to 3% by weight, based on component A), of carbon black, and does not include glass fibers and does not include fibrous substances.

2. The shaped article according to claim 1, wherein component A) of the thermoplastic molding material comprises 10 to 80 parts by weight of polyamide 6 and/or polyamide 6/6,6.

3. The shaped article according to claim 1, wherein the thermoplastic molding material comprises 0% by weight, based on component A), of inorganic fillers and reinforcing materials different from carbon black.

4. The shaped article according to claim 1, wherein the thermoplastic molding material has a gray scale, determined according to ISO 105 A02 after testing according to DBL 5416, 7.3, of 4 or more.

5. The shaped article according to claim 1, wherein the thermoplastic molding material has a gray scale, determined according to ISO 105 A02 after testing according to DBL 5416, 7.3, of 4 to 5.

6. The shaped article according to claim 1, wherein the thermoplastic molding material has a gray scale, determined according to ISO 105 A02 after testing according to DBL 5416, 7.3, of 5.

7. A method of making the shaped article according to claim 1, the method comprising mixing components A) and B) and producing the shaped article from the thermoplastic molding material.

* * * * *